(12) United States Patent
Tsai

(10) Patent No.: US 8,471,993 B2
(45) Date of Patent: Jun. 25, 2013

(54) COMMON LINE STRUCTURE AND DISPLAY PANEL AND METHOD OF MAKING THE SAME

(75) Inventor: Tung-Chang Tsai, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 265 days.

(21) Appl. No.: 12/970,893

(22) Filed: Dec. 16, 2010

(65) Prior Publication Data

US 2012/0008081 A1    Jan. 12, 2012

(30) Foreign Application Priority Data

Jul. 8, 2010    (TW) ................................ 99122454 A

(51) Int. Cl.
*G02F 1/1343*    (2006.01)
(52) U.S. Cl.
USPC ................ 349/141; 349/139; 257/59; 257/72
(58) Field of Classification Search
USPC ................ 349/139, 141; 257/59, 72
See application file for complete search history.

(56) References Cited

U.S. PATENT DOCUMENTS

| | | | |
|---|---|---|---|
| 5,978,057 A | 11/1999 | Oh | |
| 6,436,817 B2 | 8/2002 | Lee | |
| 2003/0202133 A1* | 10/2003 | Yun | ................................. 349/43 |
| 2007/0279564 A1 | 12/2007 | Iwato | |
| 2008/0043193 A1* | 2/2008 | Oke et al. | ..................... 349/144 |
| 2009/0224254 A1 | 9/2009 | Lee et al. | |
| 2009/0275176 A1 | 11/2009 | Kang et al. | |

FOREIGN PATENT DOCUMENTS

TW    I234848    6/2005

* cited by examiner

*Primary Examiner* — Michael Caley
(74) *Attorney, Agent, or Firm* — Winston Hsu; Scott Margo

(57) ABSTRACT

A method of forming a common line structure of a display panel includes the following steps. First, provide a substrate, wherein at least one first common section and at least one second common section are disposed on the substrate. Then, form a passivation layer on the substrate, the first common section, and the second common section. Subsequently, form at least one through hole penetrating the passivation layer to at least partially expose the first common section and the second common section. Thereafter, form a connection section on the passivation layer to electrically connect the first common section and the second common section exposed by the through hole.

8 Claims, 16 Drawing Sheets

COMMON LINE STRUCTURE AND DISPLAY PANEL AND METHOD OF MAKING THE SAME

BACKGROUND OF THE INVENTION

1. Field of the Invention

The present invention relates to a common line structure, a display panel, and a method of making the common line structure and the display panel, and more particularly, to a common line structure which connects two common sections by using a connection section via a through hole, a display panel with the common line structure mentioned above, and a method of making the common line structure and display panel mentioned above.

2. Description of the Prior Art

An array substrate of a display panel, such as an array substrate of a liquid crystal display panel, normally has conducting lines or electrodes, such as gate lines, data lines, common lines, and pixel electrodes, which are made of different patterned conducting layers, formed thereon, and the different patterned conducting layers are insulated by insulated layers. When an electrical connection between the different pattern conducting layers is required, for instance, when an electrical connection between the pixel electrode and the drain electrode of the thin film transistor is required, a through hole (contact hole) is formed in the insulated layer to expose the drain electrode, such that the pixel electrode can contact the drain electrode via the through hole. In consideration of the improvement of the specification of the aperture ratio of display panel, the size of through hole has to be reduced. However, the reduction of the through hole increases the depth-width ratio of the through hole, and therefore decreases the reliability of the electrical connection between the different patterned conducting layers. Accordingly, the yield of the display panel cannot be further improved.

SUMMARY OF THE INVENTION

It is therefore one of the objectives of the present invention to provide a common line structure, a display panel, and a method of making the common line structure and the display panel to increase the reliability of the common line structure and the display panel.

In accordance with an embodiment of the present invention, a method of making a common line structure includes the following steps. Provide a substrate. At least one first common section and at least one second common section are disposed on the substrate. Next, form a passivation layer on the substrate, on the first common section, and on the second common section. Then, form at least one through hole penetrating the passivation layer to partially expose the first common section and the second common section. Afterward, form a connection section on the passivation layer to electrically connect to the first common section and the second common section exposed by the through hole.

In accordance with another embodiment of the present invention, a method of making a display panel includes the following steps. First of all, provide a substrate. A gate line, a gate electrode electrically connected to the gate line, a data line, a drain electrode, at least one first common section, and at least one second common section are disposed on the substrate. Next, form a passivation layer on the substrate, on the gate line, on the gate electrode, on the data line, on the source electrode, on the drain electrode, on the first common section, and on the second common section. Then, form at least one through hole penetrating the passivation layer to partially expose the first common section and the second common section. Afterward, form a connection section on the passivation layer to electrically connect to the first common section and the second common section exposed by the through hole.

In accordance with another embodiment of the present invention, a common line structure is disposed on the substrate, and comprises at least one first common section, at least one second common section, a passivation layer, and a connection section. The first common section and the second common section are disposed on the substrate. The passivation layer is disposed on the first common section and on the second common section, and the passivation has at least one through hole to partially expose the first common section and the second common section. The connection section is disposed on the passivation layer and electrically connected to the first common section and the second common section exposed by the through hole.

In accordance with another embodiment of the present invention, a display panel comprises a substrate, a gate line, a gate electrode, a data line, a source electrode, a drain electrode, and a common line structure. The gate line, the gate electrode, the data line, the source electrode, the drain electrode, the common line structure, and the passivation layer are disposed on the substrate. The common line structure comprises at least one first common section and at least one second common section. The passivation layer is disposed on the gate line, on the gate electrode, on the data line, on the source electrode, on the drain electrode, on the first common section, and on the second common section. The passivation layer has at least one through hole, partially exposing the first common section and the second common section. The connection section is disposed on the passivation layer to electrically connect to the first common section and the second common section exposed by the through hole.

The display panel of the present invention forms a common line structure by respectively filling the connection section into the two through holes to electrically connect to the two common sections, and the sidewalls of the through holes have a stair structure or the sidewalls of the through holes have more than two slopes. Consequently, the connection section may avoid breaking resulted from the steep slope of the sidewall of the through, and thus the reliability is increased.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention, preferred embodiments will be made in detail. The preferred embodiments of the present invention are illustrated in the accompanying drawings with numbered elements.

Figure 1:
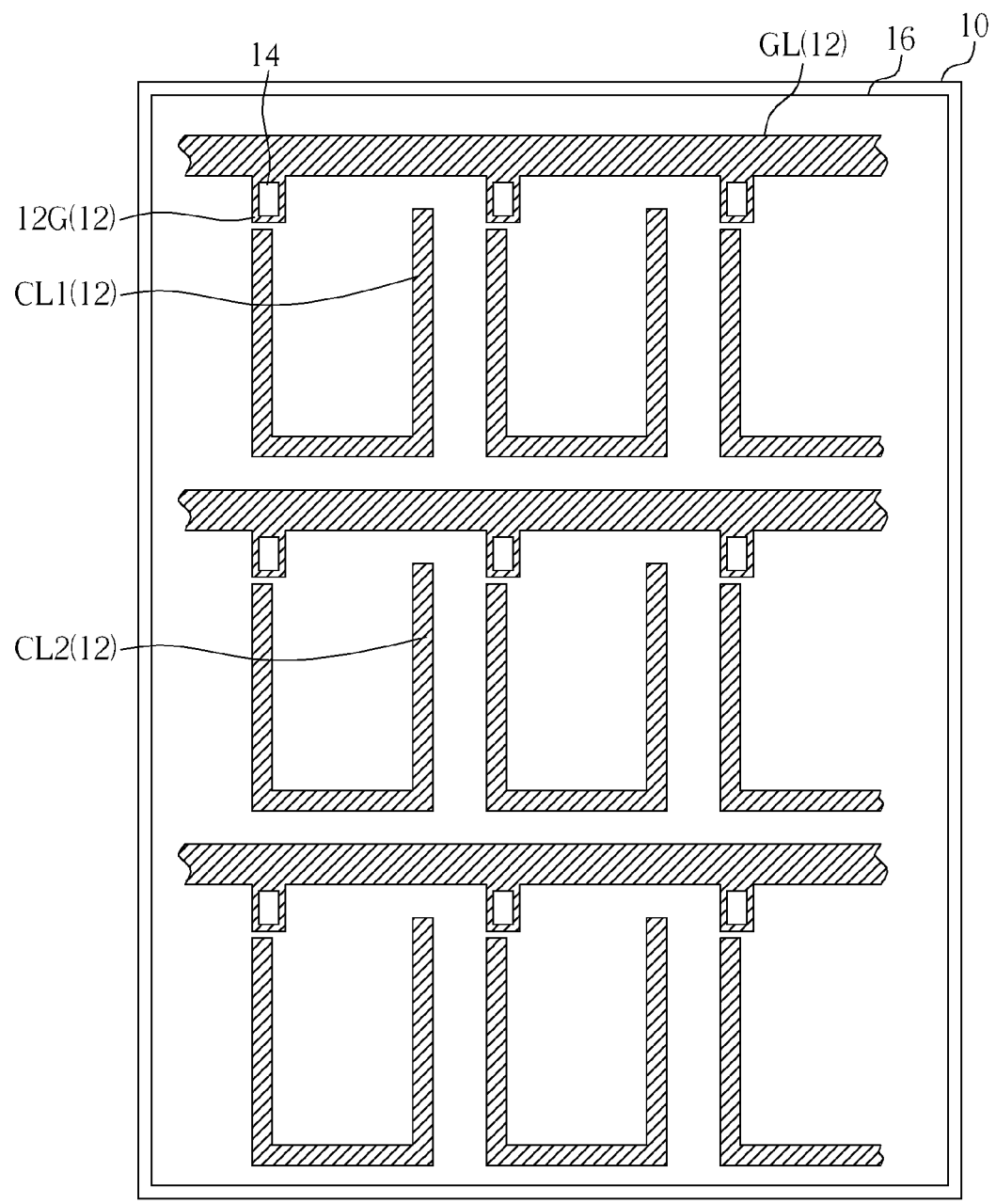
FIGS. 1-8 are schematic diagrams illustrating a method of forming a display panel and a common line structure according to a first preferred embodiment of the present invention.
Figure 2:
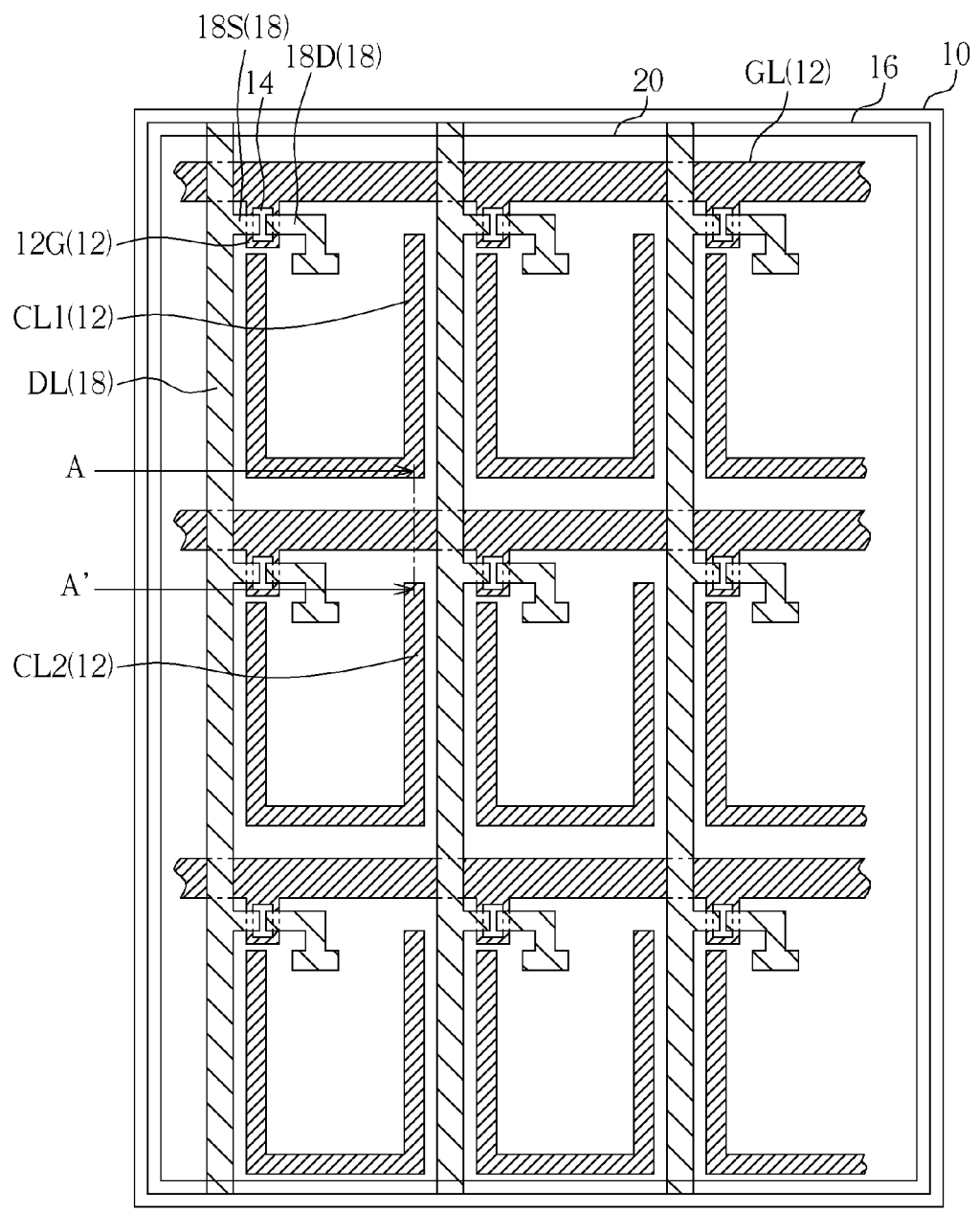
Figure 5:
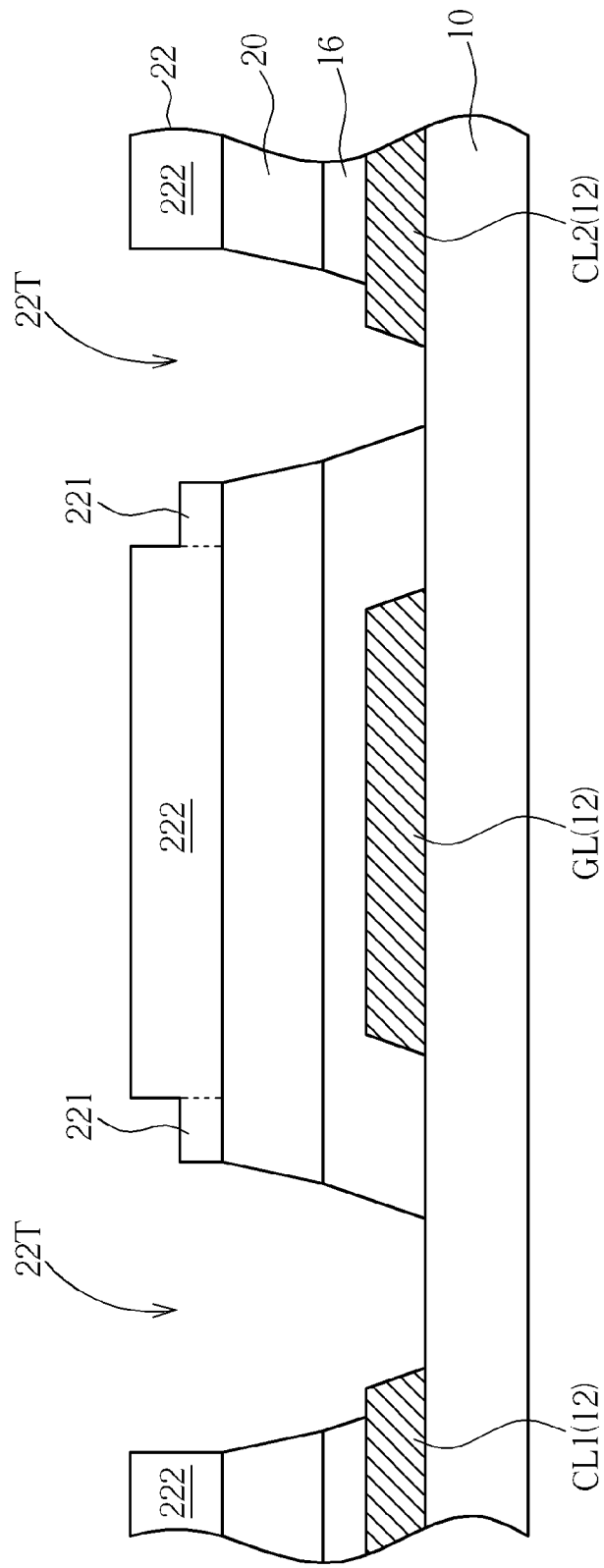
Figure 6:
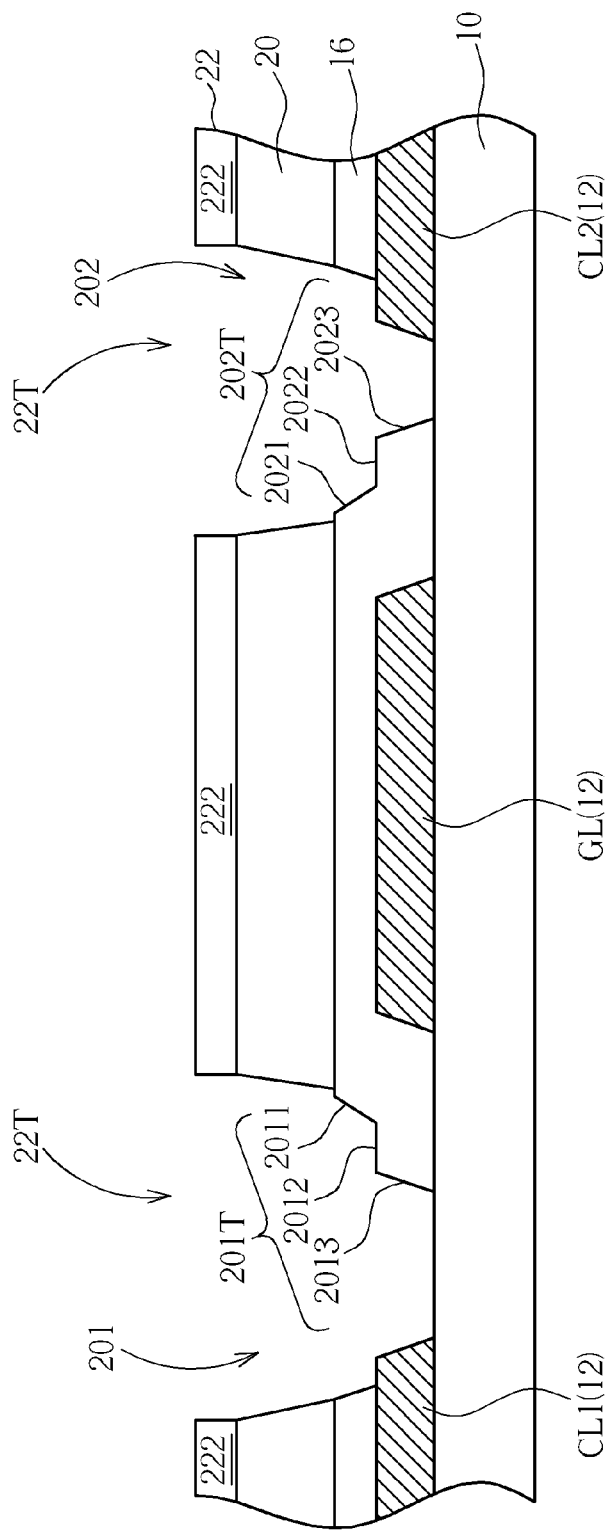
Figure 7:
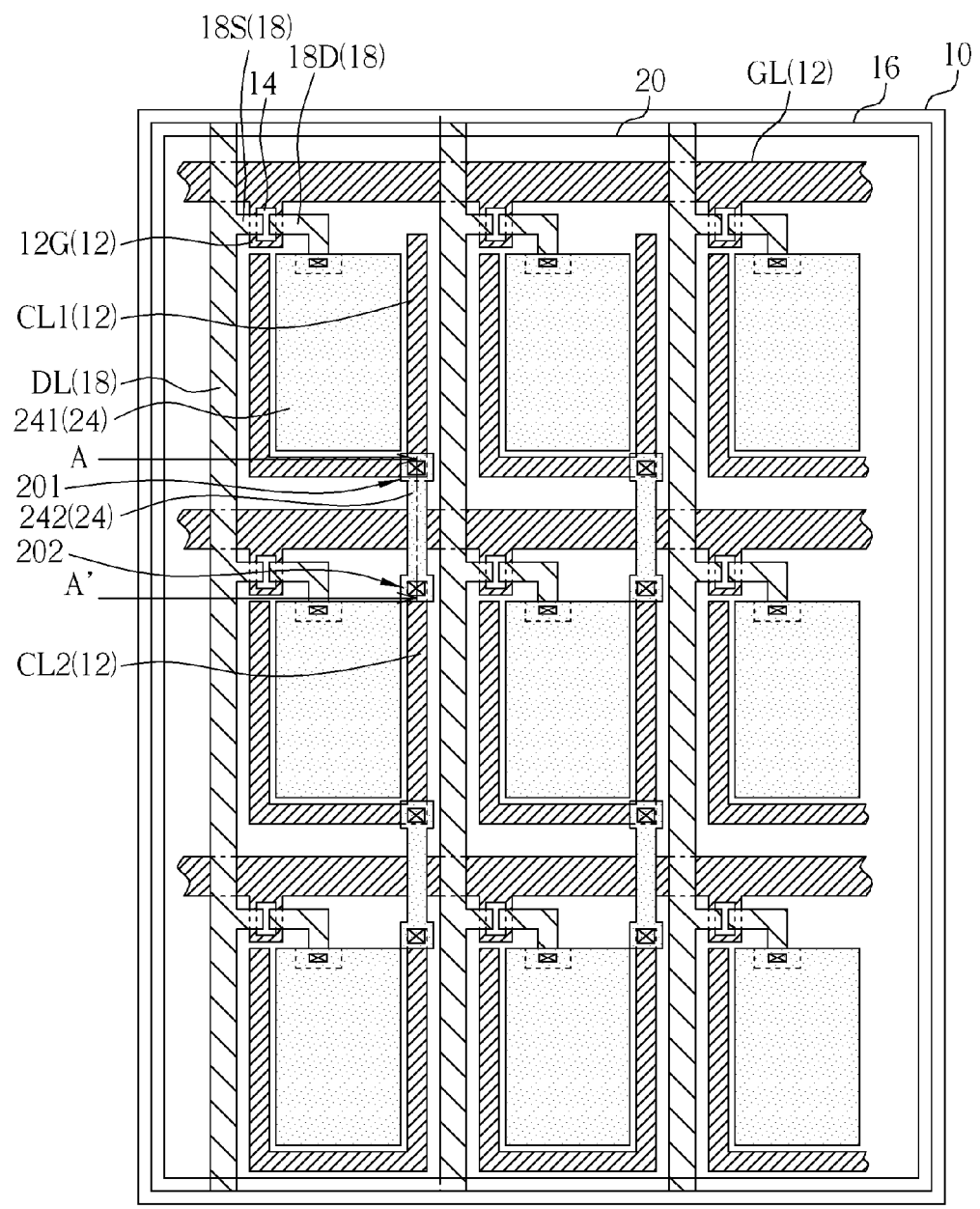

Please refer FIGS. 1-8. FIGS. 1-8 are schematic diagrams illustrating a method of forming a display panel and a common line structure according to a first preferred embodiment of the present invention. FIG. 1, FIG. 2, and FIG. 7 are drawn from top view direction, and FIGS. 3-6 and FIG. 8 are cross-sectional views taken along a cross-sectional line A-A'. As shown in FIG. 1, a substrate 10 is provided. Then, a first patterned conducting layer 12, such as a patterned metal layer, is formed on the substrate 10. The first patterned conducting layer 12 may be made of aluminum (Al), chromium (Cr), molybdenum (Mo), tungsten (W), tantalum (Ta), copper (Cu), an alloy thereof, or a combination of the materials mentioned above, but not limited thereto. For example, in this embodiment, the material of the first patterned conducting layer 12 is a composite-metal layer including molybdenum/aluminum/molybdenum. In this embodiment, the first patterned conducting layer 12 includes a gate line GL, a gate electrode 12G, at least one first common section CL1, and at least one second common section CL2, that is to say, the at least one first common section CL1 and the at least one second common section CL2 are made of the same patterned conducting layer. The gate electrode 12G is electrically connected to the gate line GL. In this step, the second common section CL2 is electrically separated from the first common section CL1. Next, a pattern semiconductor layer 14, such as a patterned amorphous silicon layer, is formed on the gate electrode 12G. Afterward, an insulated layer 16 is formed on the substrate 10, on the first patterned conducting layer 12, and on the patterned semiconductor layer 14.

Figure 3:
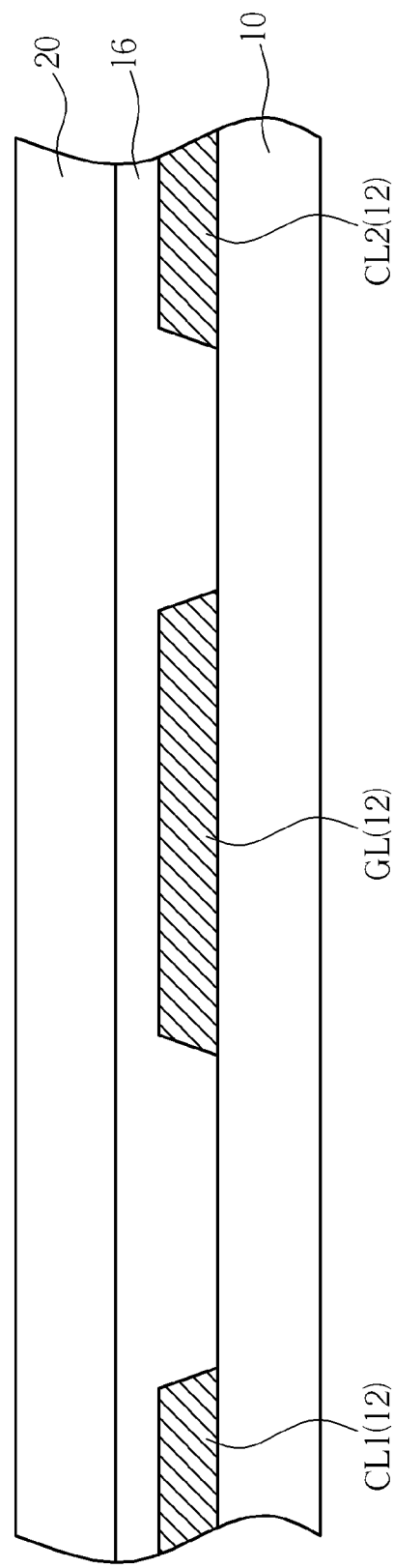

As shown in FIG. 2 and FIG. 3, a second patterned conducting layer 18 (not shown in FIG. 3), such as a patterned metal layer, is formed on the insulated layer 16. The second patterned conducting layer 18 may be made of aluminum (Al), chromium (Cr), molybdenum (Mo), tungsten (W), tantalum (Ta), copper (Cu), an alloy thereof, or a combination of the materials mentioned above, but not limited thereto. For example, in this embodiment, the material of the second patterned conducting layer 18 is a composite-metal layer including molybdenum/aluminum/molybdenum. In this embodiment, the second patterned conducting layer 18 includes a data line DL, a source electrode 18S, and a drain electrode 18D. The source electrode 18S is electrically connected to the data line DL. Then, a passivation layer 20 is formed on the insulated layer 16 and on the second patterned conducting layer 18. The passivation layer 20 may be a single-layered passivation layer or a composite-layered passivation layer.

Figure 4:
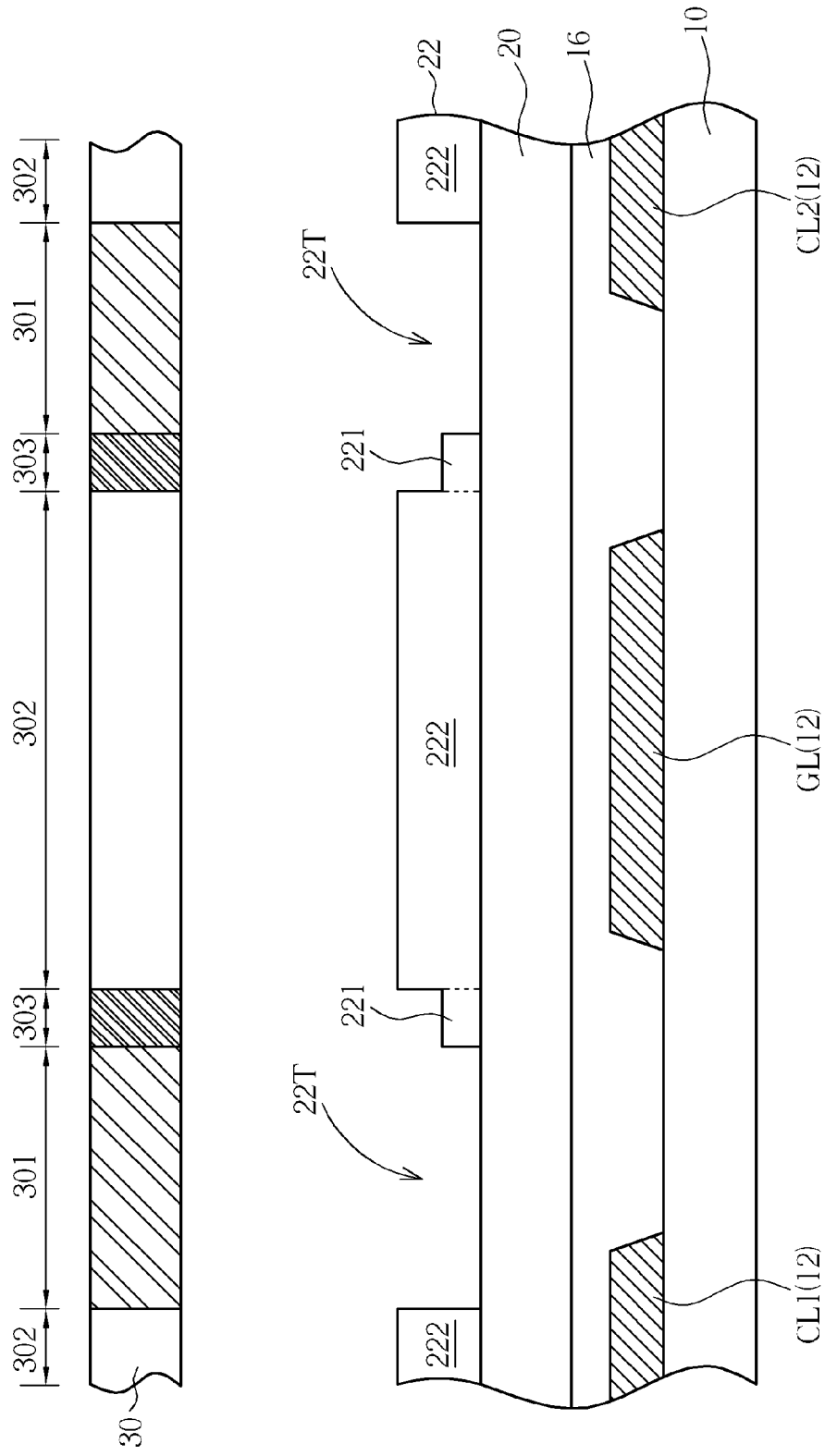

Next, the passivation layer 20 is patterned to form a plurality of through holes in the passivation layer 20 and penetrating the passivation layer 20 to partially expose the first common section CL1 and the second common section CL2. In this embodiment, as shown in FIG. 4, the passivation layer 20 is patterned by using a halftone mask or a gray scale mask in combination with photolithography technique, but not limited thereto. Patterning the passivation layer 20 includes the following steps. First of all, a mask 30 is provided, wherein the mask 30 is preferably a halftone mask or a gray scale mask. The mask 30 has a first area 301, a second area 302, and a semi-transparent area 303. Then, a photo resist layer (not shown) is formed on the passivation layer 20 and the mask 30 is used to expose the photo resist layer. After developed, a patterned photo resist 22 is formed. In this embodiment, the photo resist layer may be a positive photo resist layer so that the first area 301 of the mask 30 is a transparent area and the second area 302 of the mask 30 is an opaque area. However, if the photo resist layer is a negative photo resist layer, the first area 301 of the mask 30 may be an opaque area and the second area 302 of the mask 30 may be a transparent area. After exposing and developing, the patterned photo resist 22 includes an opening 22T, a first region 221, and a second region 222. The opening 22T is corresponding to the first area 301 of the mask 30 and partially overlaps the first common section CL1 and the second common section CL2 in a vertical projection direction. The first region 221 is corresponding to the semi-transparent area 303 of the mask 30. The first region 221 adjoins the opening 22T and does not overlap the first common section CL1 and the second common section CL2. The second region 222 is corresponding to the second area 302 of the mask 30 and surrounds the first region 221 and the opening 22T. The thickness of the first region 221 is thinner than the thickness of the second region 222.

As shown in FIG. 5, the patterned photo resist 22 is used as a mask to etch the passivation layer 20 exposed by the opening 22T of the patterned photo resist 22 and the insulated layer 16 beneath the passivation layer 20 as well. As shown in FIG. 6, then, the first region 221 of the patterned photo resist 22 is removed and the thickness of the second region 222 of the patterned photo resist 22 is reduced by an ashing process or by controlling the parameters of the etching process. Then, the passivation layer 20 exposed by the patterned photo resist 22 and a part of the insulated layer 16 are etched to form at least one first through hole 201 and at least one second through hole 202. The first through hole 201 partially exposes the first common section CL1 and the second through hole 202 partially exposes the second common section CL2. By the two-phase etching mentioned above, a sidewall of the insulated layer 16 exposed by the first through hole 201 and a sidewall of the insulated layer 16 exposed by the second through hole 202 respectively have stair structures 201T, 202T. The stair structure 201T includes a first slanted surface 2011, a flat surface 2012, and a second slanted surface 2013; and the stair structure 202T includes a first slanted surface 2021, a flat surface 2022, and a second slanted surface 2023. The first through hole 201 at least exposes a sidewall of the first common section CL1 and may even expose a part of the upper surface of the first common section CL1. The second through hole 202 at least exposes a sidewall of the second common section CL2 and may even expose a part of the upper surface of the second common section CL2.

Figure 8:
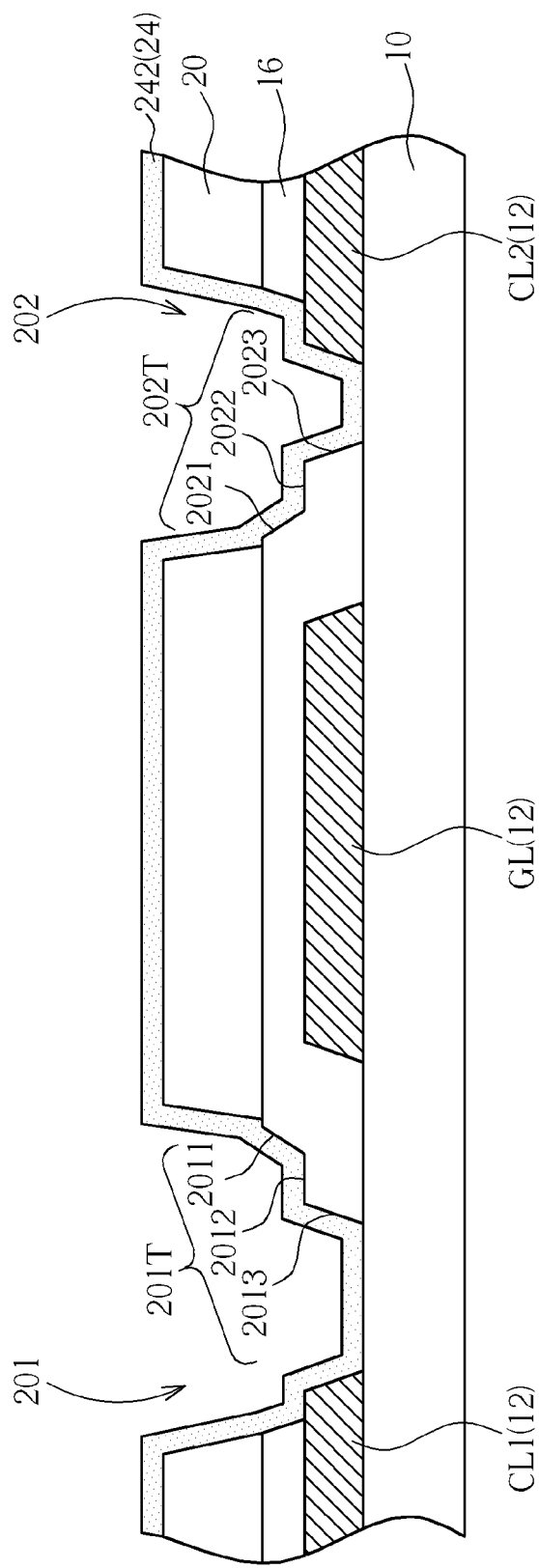

As shown in FIG. 7 and FIG. 8, the patterned photo resist 22 is removed. Then a patterned transparent conducting layer 24 is formed on the passivation layer 20. The patterned transparent conducting layer 24 includes at least one pixel electrode 241 (not shown in FIG. 8) and at least one connection section 242. The pixel electrode 241 is electrically connected to the drain electrode 18D. The pixel electrode 241 may overlap a part of the first common section CL1 and/or a part of the second common section CL2, but not limited thereto. In this embodiment, based on the discretion of designers, the patterned transparent conducting layer 24 may be replaced with an opaque conducting material, such as a metal conducting material, but is not limited thereto. The connection section 242 creates an electrical connection between the first common section CL1 and the second common section CL2 via the first through hole 201 and via the second through hole 202 to form the common line structure in the present embodiment. Because of the stair structure 201T of the first through hole 201 and the stair structure 202T of the second through hole 202, the connection section 242 will not be broken due to the over-slanted sidewalls of the first through hole 201 and the second through hole 202 as the connection section 242 is filled into the first through hole 201 and the second through hole 202. Moreover, the substrate 10 may further be assembled with another substrate (not shown) and liquid crystal molecules may be formed between the two substrates therefore to form a display panel of this embodiment.

Accordingly, the common line structure of the present embodiment is formed by using the connection section 242 to bridge the first common section CL1 and the second common section CL2. Due to the design of the stair structure of the sidewall of the first through hole 201 and the second through hole 202, the broken line risk of the connection section 242 is reduced and the reliability is further improved.

Figure 9:
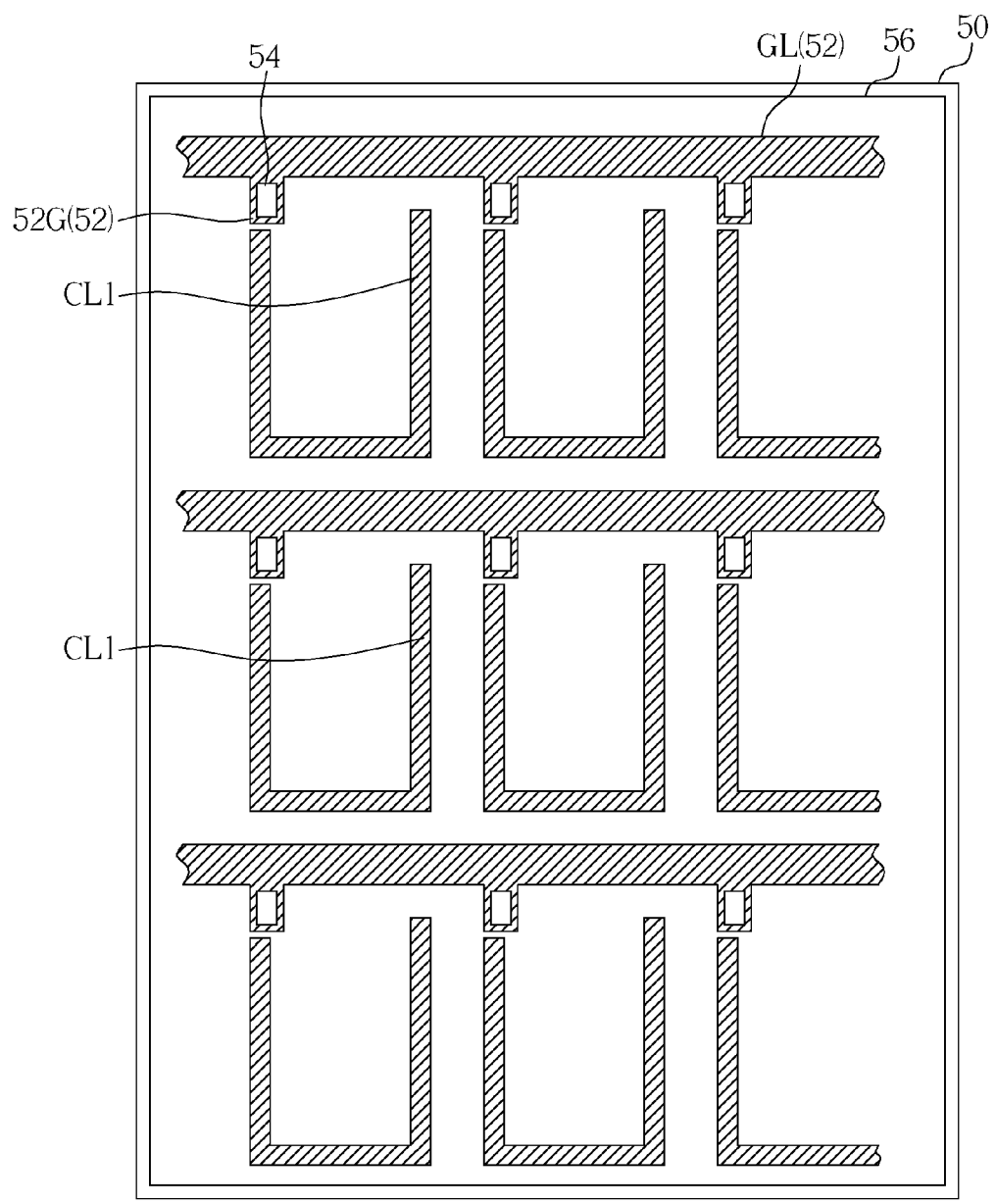
FIGS. 9-16 are schematic diagrams illustrating a method of forming a display panel and a common line structure according to a second preferred embodiment of the present invention.
Figure 10:
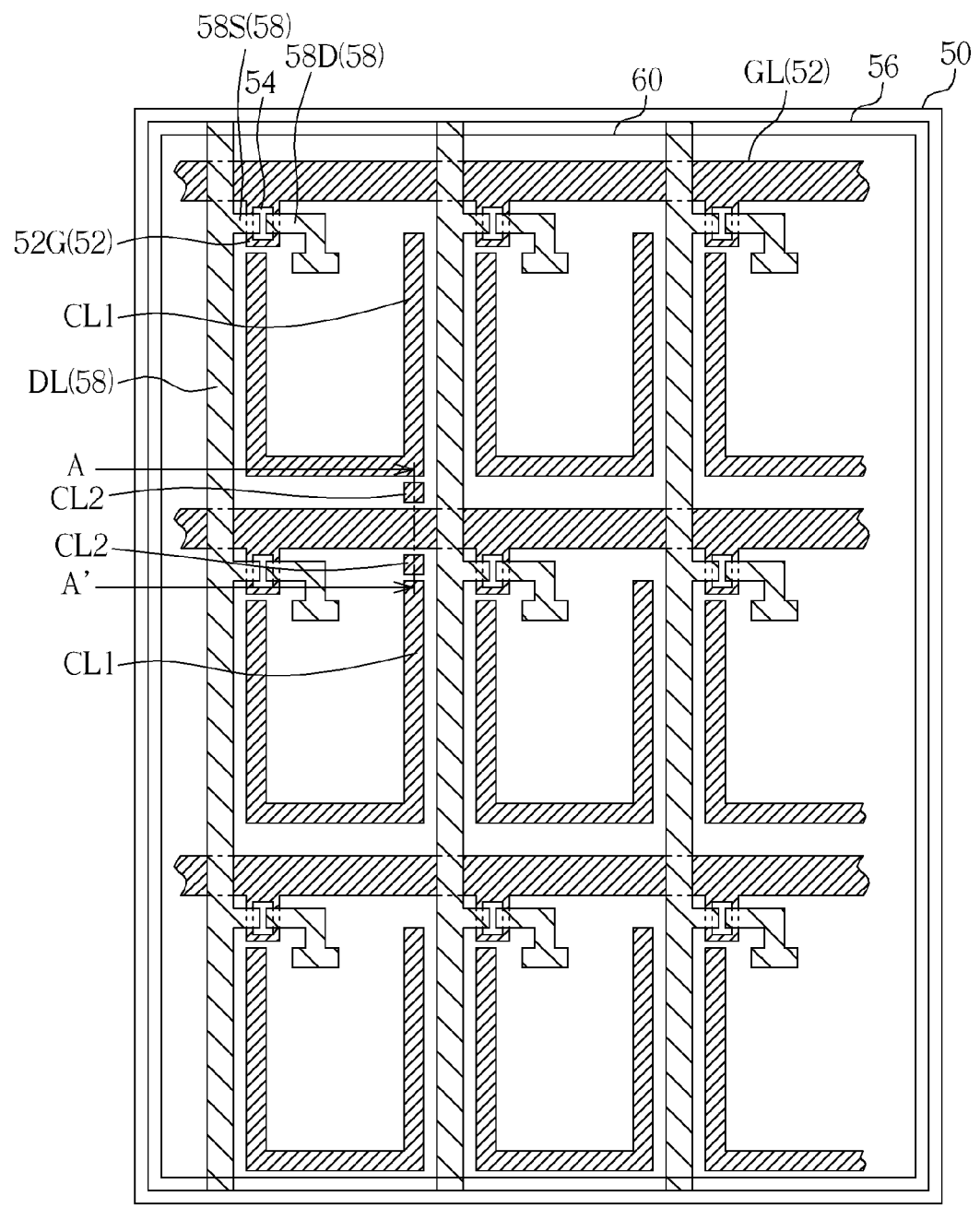
Figure 13:
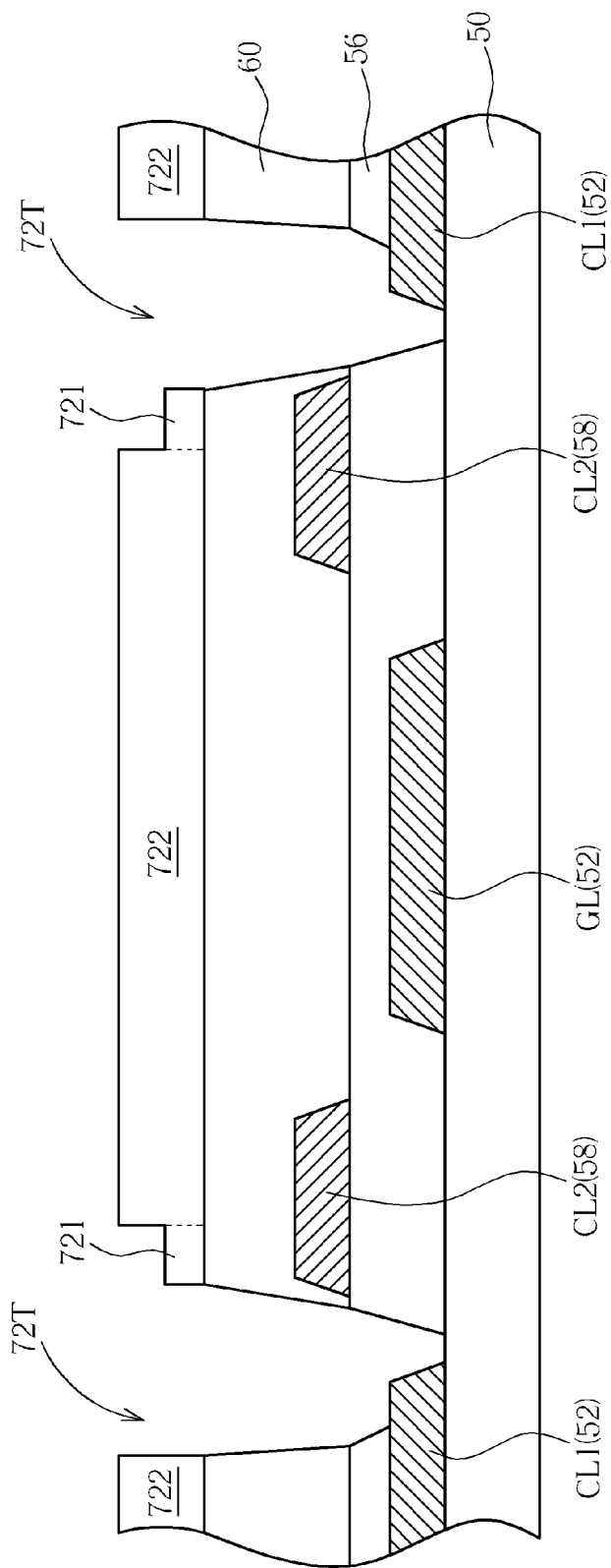
Figure 14:
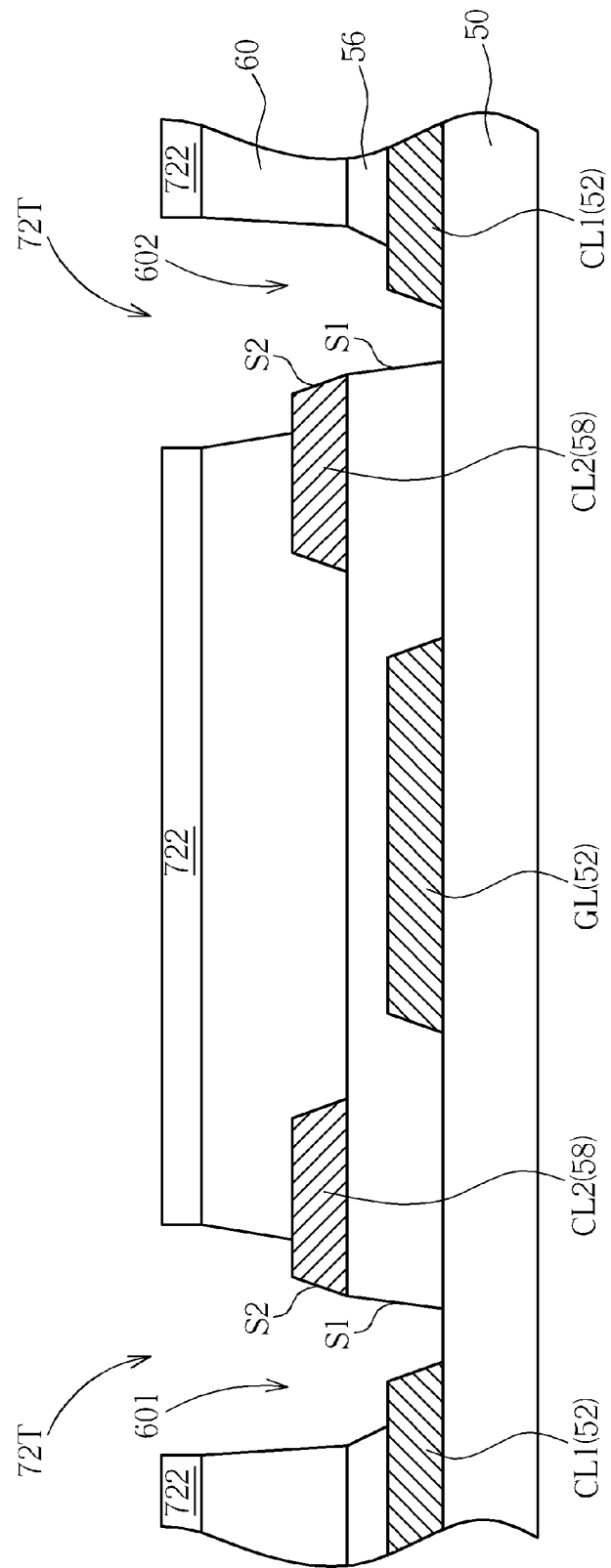
Figure 15:
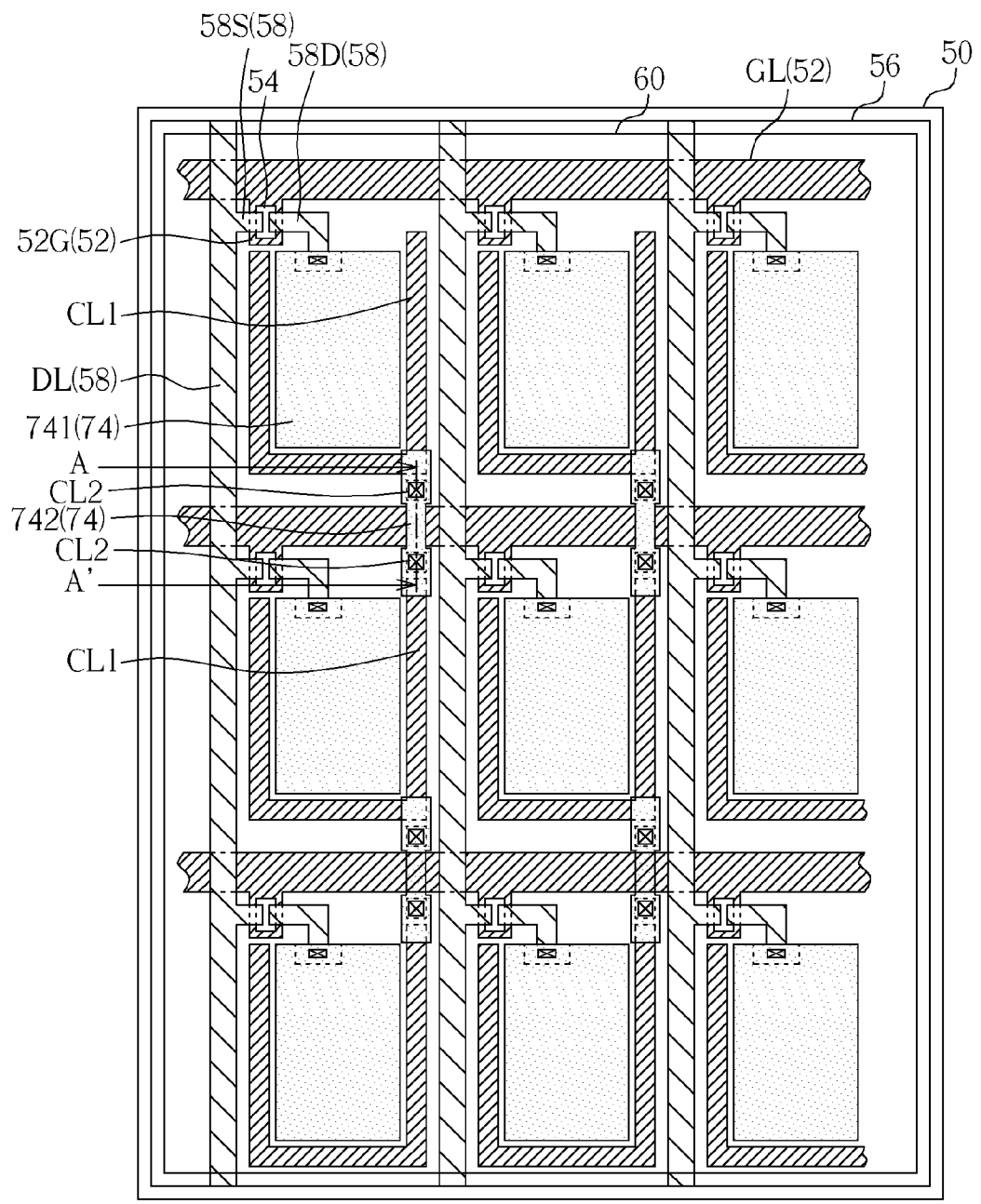

Please refer to FIGS. 9-16. FIGS. 9-16 are schematic diagrams illustrating a method of forming a display panel and a common line structure according to a second preferred embodiment of the present invention. FIG. 9, FIG. 10, and FIG. 15 are drawn from top view direction, and FIGS. 11-14 and FIG. 16 are cross-sectional views taken along a cross-sectional line A-A'. To describe briefly, the following embodiments are focus on the difference between each embodiment and repeated parts are not redundantly described. As shown in FIG. 9, a substrate 50 is provided. Then a first patterned conducting layer 52 is formed on the substrate 50. In the present embodiment, the first patterned conducting layer 52 includes a gate line GL, a gate electrode 52G, and two first common sections CL1. The gate electrode 52G is electrically connected to the gate line GL. Then, a patterned semiconductor layer 54 is formed on the gate electrode 52G. Afterward, an insulated layer 56 is formed on the substrate 50, on the first patterned conducting layer 52, and on the patterned semiconductor layer 54.

Figure 11:
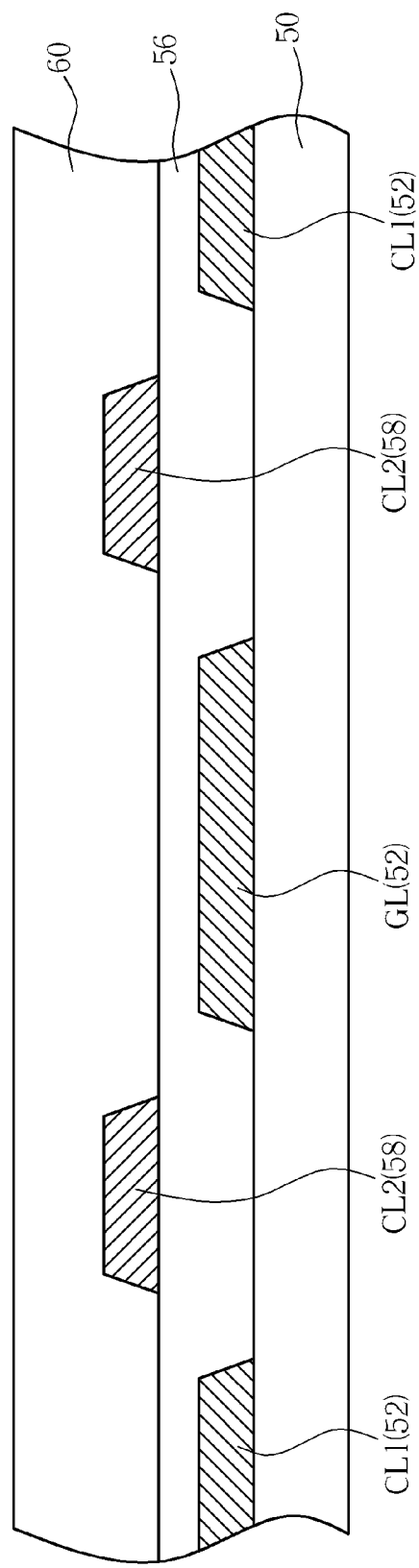

As shown in FIG. 10 and FIG. 11, a second patterned conducting layer 58 is formed on the insulated layer 56. In this embodiment, the second patterned conducting layer 58 includes a data line DL, a source electrode 58S, a drain electrode 58D, and two second common sections CL2. The source electrode 58S is electrically connected to the data line DL. In this step, the two second common section CL2 are electrically separated from each other, and electrically separated from the first common sections CL1 as well. Next, a passivation layer 60 is formed on the insulated layer 56 and on the second patterned conducting layer 58.

Figure 12:
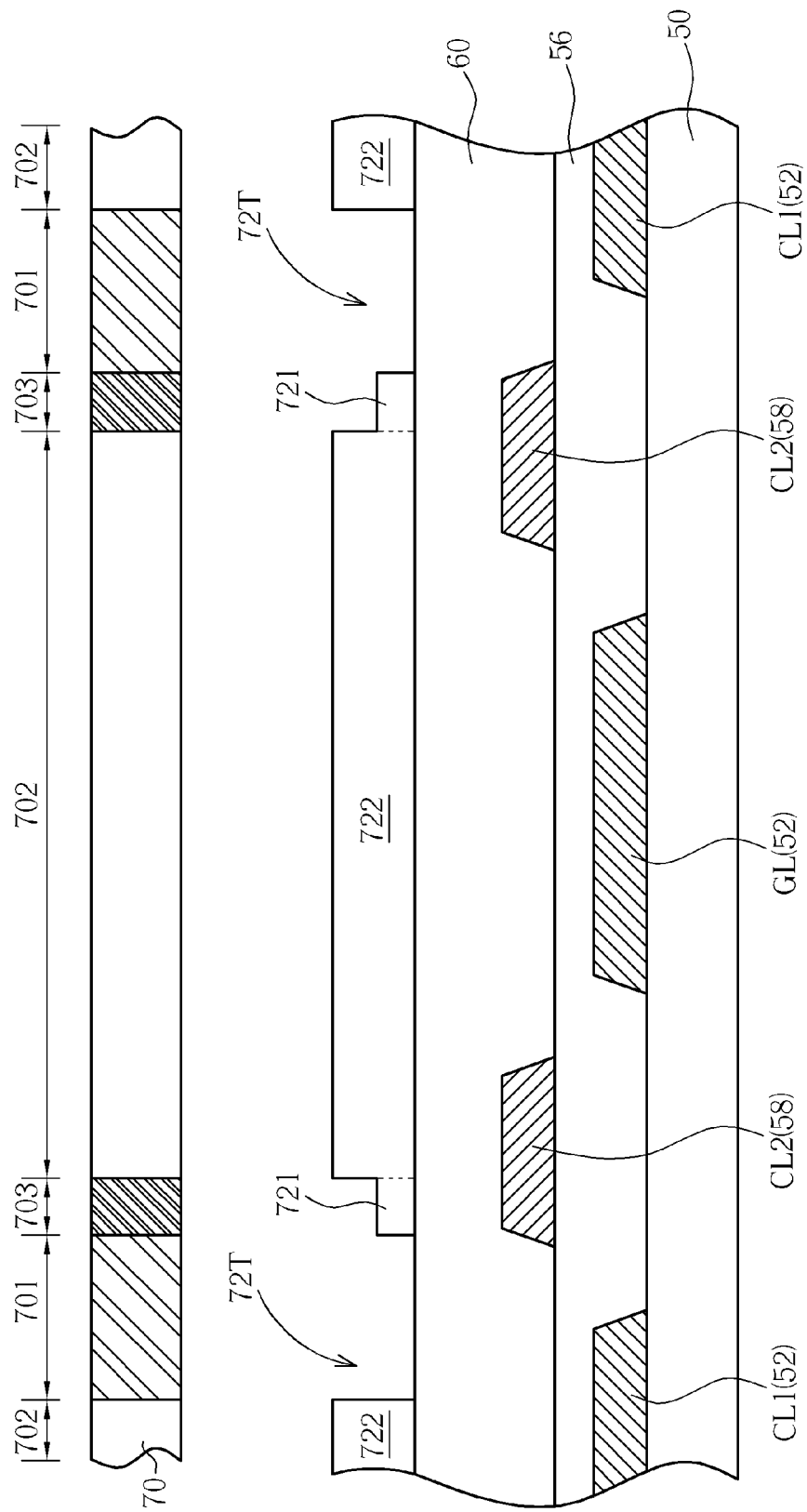

As shown in FIG. 12, the passivation layer 60 is patterned to form a plurality of through holes in the passivation layer 60 and penetrating the passivation layer 60 to partially expose the two first common sections CL1 and the two second common sections CL2. In the present embodiment, the passivation layer 60 is patterned by using a halftone mask or a gray scale mask in combination with photolithography technique, but not limited thereto. Patterning the passivation layer 60 includes the following steps. First of all, a mask 70 is provided. The mask 70 is preferably a halftone mask or a gray scale mask. The mask 70 has a first area 701, a second area 702, and a semi-transparent area 703. Then, a photo resist layer (not shown) is formed on the passivation layer 60 and the photo resist layer is exposed by the mask 70. After developed, a patterned photo resist 72 is formed. In this embodiment, the photo resist may be a positive photo resist. Under such a condition, the first area 701 of the mask 70 is a transparent area and the second area 702 is an opaque area. However, if the photo resist is a negative photo resist, the first area 701 of the mask 70 is an opaque area and the second area 702 is a transparent area. The patterned photo resist 72 includes an opening 72T, a first region 721, and a second region 722. The opening 72T is corresponding to the first area 701 of the mask 70 and partially overlaps the two first common sections CL1 but does not overlap the two second sections CL2 in the vertical projection direction. The first region 721 is corresponding to the semi-transparent area 703 of the mask 70. The first region 721 adjoins the opening 72T and overlaps the two second common sections CL2 but does not overlap the two first common sections CL1 in the vertical projection direction. The second region 722 is corresponding to the second area 702 of the mask 70 and surrounds the first region 721 and the opening 72T. The thickness of the first region 721 is thinner than the thickness of the second region 722.

As shown in FIG. 13, the patterned photo resist 72 is used as a mask to etch the passivation layer 70 exposed by the opening 72T of the patterned photo resist 72 and the insulated layer 66 beneath the passivation layer 70 as well. As shown in FIG. 14, then, the first region 721 of the patterned photo resist 72 is removed and the thickness of the second region 722 of the patterned photo resist 72 is reduced by an ashing process or by controlling parameters of the etching process. Next, the passivation layer 70 exposed by the patterned photo resist 72 and a part of the insulated layer 66 are etched to from at least one first through hole 601 and at least one second through hole 602. The first through hole 601 penetrates the passivation layer 70 and the insulated layer 66 and partially exposes one of the two first common sections CL1 and one of the two second common sections CL2. The second through hole 602 penetrates the passivation layer 70 and the insulated layer 66 and partially exposes the other of the two first common sections CL1 and the other of the second common sections CL2. According to the two-phase etching mentioned above, the sidewall of the insulated layer 66 exposed by the first through hole 601 and the sidewall of the insulated layer 66 exposed by the second through hole 602 respectively have a first slope S1, the sidewall of the second common section CL2 exposed by the first through hole 601 and the sidewall of the second common section CL2 exposed by the second through hole 602 respectively have a second slope S2, and the second slope S2 is less than the first slope S1. As shown in FIG. 14, the first through hole 601 at least exposes the sidewall of the first common section CL1 and may even expose a portion of the upper surface of the first common section CL1. The first through hole 601 also at least exposes the sidewall of the second common section CL2 and may even expose a portion of the upper surface of the second common section CL2. The second through hole 602 at least exposes the sidewall of the first common section CL1 and may even expose a portion of the upper surface of the first common section CL1. The second through hole 602 also at least exposes the sidewall of the second common section CL2 and may even expose a portion of the upper surface of the second common section CL2.

Figure 16:
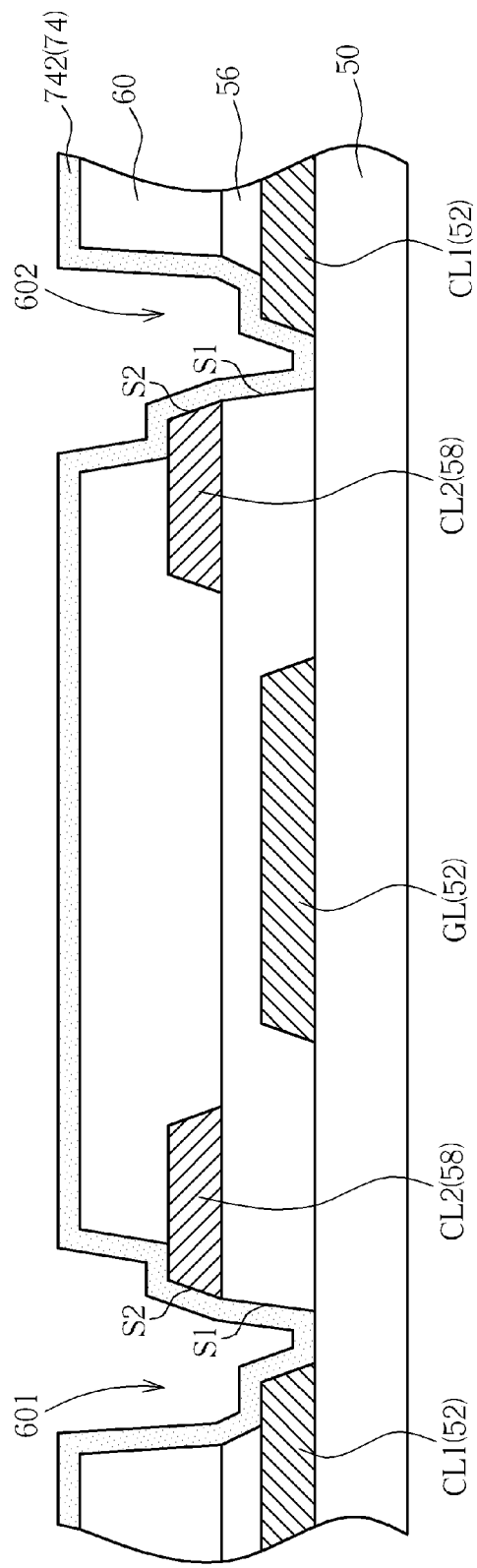

As shown in FIG. 15 and FIG. 16, the patterned photo resist 72 is removed. Then, a patterned transparent conducting layer 74 is formed on the passivation layer 70. The patterned transparent conducting layer 74 includes at least one pixel electrode 741 (not shown in FIG. 16) and at least one connection section 742. The pixel electrode 741 is electrically connected to the drain electrode 58D. The connection section 742 creates an electrical connection between the two first common sections CL1 and the two second common sections CL2 via the first through hole 601 and the second through hole 602 therefore to form the common line structure of the present embodiment. In the first through hole 601 and in the second through hole 602, since the second slope S2 of the sidewall of the second common section CL2 is less than the first slope S1 of the sidewall of the insulated layer 66 which is beneath the second common section CL2, the connection section 742 will not be broken due to the over-slanted sidewalls of the first through hole 601 and the second through hole 602 as the connection section 742 is filled into the first through hole 601 and into the second through hole 602. Moreover, the substrate 50 may further be assembled with another substrate (not shown) and liquid crystal molecules may be formed between the two substrates therefore to form a display panel of the present embodiment. In this embodiment, based on the discretion of designers, the patterned transparent conducting layer 74 may be replaced by an opaque conducting material, such as metal conducting materials, but not limited thereto.

In conclusion, the display panel of the present invention fills the connection section into the two through holes to electrically connect two common sections and therefore to form a common line structure. Also, the sidewall of the through hole has a stair structure or more than two slopes so that the connection section is ensured from being broken. Thus, the reliability is improved.

Those skilled in the art will readily observe that numerous modifications and alterations of the device and method may be constructed while retaining the teachings of the invention.

What is claimed is:

1. A common line structure, disposed on a substrate, the common line structure comprising:
    at least one first common section, disposed on the substrate;
    at least one second common section, disposed on the substrate, wherein the first common section and the second section are made of a same patterned conducting layer;
    a passivation layer, disposed on the at least one first common section and on the at least one second common section, wherein the passivation layer having at least one through hole, partially exposing the at least one first common section and the at least one second common section, the at least one through hole comprises a first through hole and a second through hole, the first through hole partially exposes the first common section, and the second through hole partially exposes the second common section;
    a connection section, disposed on the passivation layer, wherein the connection section is electrically connected to the at least one first common section and to the at least one second common section exposed by the through hole; and
    an insulated layer, disposed between the first common section and the passivation layer, and between the first common section and the second common section, wherein the first through hole penetrates the passivation layer and the insulated layer to partially expose the first common section, and the second through hole penetrates the passivation layer and the insulated layer to partially expose the second common section, wherein a sidewall of the insulated layer exposed by the first through hole and a sidewall of the insulated layer exposed by the second through hole respectively have a stair structure, and each of the stair structures comprises a first slanted surface, a flat surface, and a second slanted surface.

2. The common line structure according to claim 1, wherein the connection section is made of a patterned transparent conducting layer.

3. The common line structure according to claim 1, wherein the connection section contacts a slanted surface and a portion of a top surface of the at least one first common section exposed by the first through hole.

4. The common line structure according to claim 3, wherein the connection section contacts a slanted surface and a portion of a top surface of the at least one second common section exposed by the second through hole.

5. A display panel, comprising:
    a substrate;
    a gate line, a gate electrode, a data line, a source electrode, and a drain electrode disposed on the substrate;
    a common line structure, disposed on the substrate, wherein the common line structure comprises at least one first common section and at least one second common section, the gate line, the gate electrode, the at least one first common section and the at least one second common section are made of a first patterned conducting layer, and the data line, the source electrode and the drain electrode are made of a second patterned conducting layer;
    a passivation layer, disposed on the gate line, on the gate electrode, on the data line, on the source electrode, on the drain electrode, on the first common section, and on the second common section, wherein the passivation layer has at least one through hole partially exposing the first common section and the second common section, the at least one through hole comprises a first through hole and a second through hole, the first through hole partially exposes the first common section, and the second through hole partially exposes the second common section;
    a connection section, disposed on the passivation layer, wherein the connection section is electrically connected to the first common section and to the second common section exposed by the through hole;
    an insulated layer, disposed between the first common section and the second common section, wherein the first through hole penetrates the passivation layer and the insulated layer to partially expose the first common section, and the second through hole penetrates the passivation layer and the insulated layer to partially expose the second common section, wherein a sidewall of the insulated layer exposed by the first through hole and a sidewall of the insulated layer exposed by the second through hole respectively have a stair structure, and each of the stair structures comprises a first slanted surface, a flat surface, and a second slanted surface.

6. The display panel according to claim 5, wherein the connection section is made of a patterned transparent conducting layer, the patterned transparent conducting layer further comprises a pixel electrode, and the pixel electrode is electrically connected to the drain electrode and electrically separated from the connection section.

7. The display panel according to claim 5, wherein the connection section contacts a slanted surface and a portion of a top surface of the at least one first common section exposed by the first through hole.

8. The display panel according to claim 7, wherein the connection section contacts a slanted surface and a portion of a top surface of the at least one second common section exposed by the second through hole.

* * * * *